(12) United States Patent
Jones

(10) Patent No.: US 7,731,264 B1
(45) Date of Patent: Jun. 8, 2010

(54) OVERLAY FOR A MOTORCYCLE INNER FAIRING

(76) Inventor: Derik T. Jones, 3540 W. Grand River Ave., Howell, MI (US) 48855

( * ) Notice: Subject to any disclaimer, the term of this patent is extended or adjusted under 35 U.S.C. 154(b) by 0 days.

(21) Appl. No.: 12/012,373

(22) Filed: Feb. 1, 2008

(51) Int. Cl.
*B62J 17/00* (2006.01)
(52) U.S. Cl. .................. 296/78.1; 280/288; 180/219
(58) Field of Classification Search ............. 296/78.1, 296/371, 1.08, 39.1, 182.1; 180/219; 438/51
See application file for complete search history.

(56) References Cited

U.S. PATENT DOCUMENTS

| | | | | |
|---|---|---|---|---|
| 4,515,405 | A * | 5/1985 | Ogishima | 296/78.1 |
| 5,330,029 | A * | 7/1994 | Yoshimura et al. | 180/219 |
| D409,527 | S | 5/1999 | Davidson et al. | |
| 5,925,211 | A * | 7/1999 | Rakauskas | 156/306.9 |
| 2003/0148135 | A1* | 8/2003 | Ellstrom | 428/537.1 |
| 2005/0098257 | A1* | 5/2005 | Bauer et al. | 156/212 |
| 2005/0121935 | A1* | 6/2005 | Bell | 296/78.1 |
| 2005/0276874 | A1* | 12/2005 | Menaldo et al. | 425/129.1 |
| 2007/0054116 | A1* | 3/2007 | Neitzke | 428/343 |
| 2009/0058118 | A1* | 3/2009 | Hein et al. | 296/1.08 |

OTHER PUBLICATIONS

A 3 page document from a website downloaded from internet @ www.dragspecialties.com/fatbook/23/185/3869599?q=fairing entitled "Dash and Inner Fairing Trim Kits".
A 1 page catalog page from a website downloaded from Internet @ www.jpcycles.com/catalog/2008HarleyFirstEditionCatalog/t.asp.
A 1 page catalog page from a website downloaded from internet @ http://guernseyharleydavidson.com/pdf/2008/English/378_511_UK_Touring.pdf.
A 1 page catalog page from MC Advantages 2008 catalog, p. 115.
A 2 page document from a website downloaded from Internet @ www.dragspecialties.com/fatbook/23/185/3869599?q=fairing entitled "Custom Farings".

* cited by examiner

*Primary Examiner*—Patricia L Engle
*Assistant Examiner*—SunSurraye Westbrook
(74) *Attorney, Agent, or Firm*—T.L. Garrett, PLC

(57) ABSTRACT

An overlay for a motorcycle inner fairing including a conformal overlay that conforms to dimensional features of an inner fairing substrate, the inner fairing substrate includes a plurality of associated peripheral edges defining an inner surface, an outer surface, and an associated thickness t.

14 Claims, 5 Drawing Sheets

OVERLAY FOR A MOTORCYCLE INNER FAIRING

FIELD OF THE INVENTION

The present invention generally relates to motorcycle fairings and more particularly relates to an overlay for motorcycle inner fairings.

BACKGROUND OF THE INVENTION

Modern motorcycles may include an inner and an outer fairing. The inner and outer fairings cooperate to shield a rider from wind as well as protecting the rider from small debris that may be present on a road or propelled through the air by other vehicles traveling upon the road.

The inner fairing of a motorcycle may also operate to: provide a means for mounting various electronics and gauges normally found upon a motorcycle; provide a means of mounting the outer fairing; and cover and conceal underlying structural components of a motorcycle such as the frame, handlebars, and steering joint.

Because of the location of the inner fairing, the inner fairing is highly visible to both the rider of a motorcycle and others who may see the motorcycle. As the inner fairing is frequently seen, both manufacturers of inner fairings and users may desire the inner fairing have an aesthetically pleasing and durable finish.

Generally, a manufacturer of an inner fairing provides an inner fairing substrate with one of four types of finishes. Each of the finishes inherently includes several undesirable attributes.

Flat, or non-reflective paint, is known to be aesthetically unpleasing. The aesthetic unpleasantness of a part finished with flat paint may result in lower perceived quality. Additionally, flat paint is known to be prone to fading when exposed to light and heat from the sun.

Gloss paint is known to cause parts finished therewith to reflect light. The reflected light may be directed into the eyes of a motorcycle rider, causing fatigue. If the reflected light is of sufficient intensity, a dangerous situation may result, in that a motorcycle rider may be blinded by the reflected light and unable to see that which lies ahead of the motorcycle.

Additionally, gloss paint is known to be very easily scratched, and therefore requires extreme care be taken in manufacturing, shipping, assembly, and use of parts finished with gloss paint. Gel coats currently applied to inner fairings present the same undesirable attributes as gloss paint.

Inner fairing substrates finished by powder coating often present an aesthetically unpleasing finish. The unpleasing finish causes a perception of low quality or reduced value, thereby making an inner fairing substrate finished with a powder coat less desirable.

Therefore, what is needed is an overlay for an inner fairing substrate that provides an aesthetically pleasing finish, is durable, and provides a perception of high quality or high value.

SUMMARY

An overlay for a motorcycle inner fairing includes a conformal overlay that conforms to dimensional features of an inner fairing substrate, the inner fairing substrate includes a plurality of associated peripheral edges defining an inner surface, an outer surface, and an associated thickness t. A method of forming the overlay to the inner fairing is also disclosed.

BRIEF DESCRIPTION OF THE DRAWINGS

These and other objects, features and advantages of the present invention will become apparent from the following detailed description and the appended drawings in which.

DETAILED DESCRIPTION OF THE INVENTION

Figure 1:
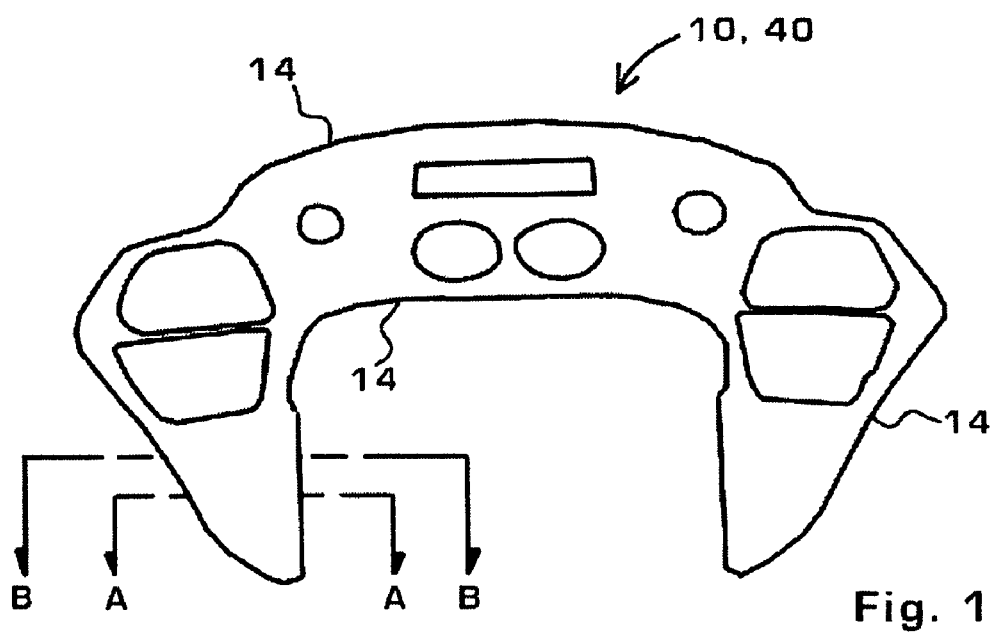
FIG. 1 illustrates a front elevation view of a motorcycle inner fairing including an overlay in accordance with an embodiment of the invention.

Referring to the drawings generally, a motorcycle 22 may include an inner fairing that may operate to: provide a means for mounting various electronics and gauges normally associated with a motorcycle 22; provide means of mounting the outer fairing; and cover and conceal underlying structural components of a motorcycle 22 such as the frame, handlebars, and steering joint. The motorcycle inner fairing is also capable of maintaining a substantially rigid structure when the motorcycle 22 is operated at normal driving speeds and at rest.

Figure 2:
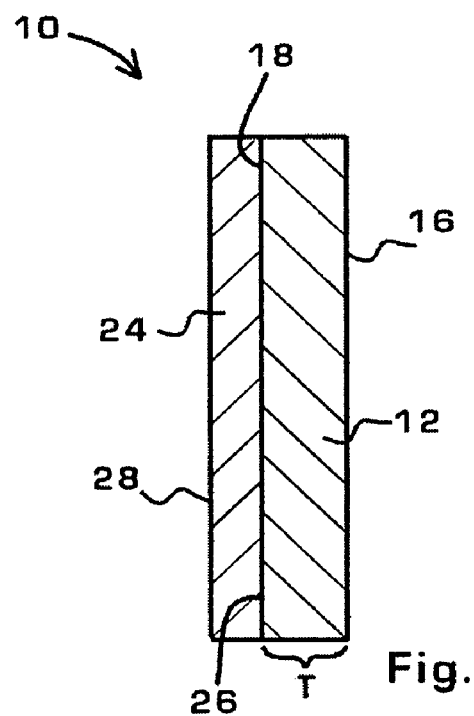
FIG. 2 illustrates a partial cross-sectional view of an overlay for the fairing shown in FIG. 1 taken along section line A-A having a first layer and formed upon a motorcycle inner fairing substrate in accordance with an embodiment of the invention.

Referring now to FIGS. 1 and 2, an overlay 10,40 for a motorcycle inner fairing is provided. In one embodiment of the invention, the overlay 10,40 is conformally formed upon an inner fairing substrate 12, the inner fairing substrate 12 having a plurality of associated peripheral edges 14 defining an inner surface 16, an outer surface 18, and an associated thickness t. The substrate 12 may be adapted to be fixably or removably secured to a motorcycle 22.

Figure 3:
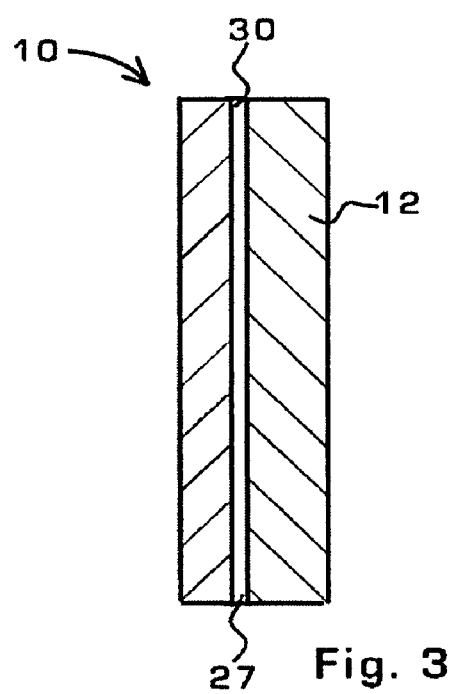
FIG. 3 illustrates a partial cross-sectional view of an overlay for the fairing shown in FIG. 1 taken along section line A-A having a first layer and an interface formed upon a motorcycle inner fairing substrate in accordance with an embodiment of the invention.

A cross-section of overlay 10 is shown as cross-section A-A in FIGS. 2 and 3 and is disclosed in more detail below. A cross-section of overlay 40 is shown as cross-section B-B and is disclosed in more detail in FIGS. 6 and 7.

In one embodiment of the invention, the substrate 12 may be formed of any material able to be formed in a desired shape for an inner fairing and having sufficient strength and rigidity after having been formed to operate as an inner fairing, that is, being sufficiently rigid when operated at normal driving speeds, as well as at rest. The substrate material is also formulated to resist environmental factors including, but not limited to: heat, cold, and wind. Examples of suitable substrate materials include, but are not limited to: plastics, thermoplastics, fiberglass, carbon fiber, metal, and the like.

Conformally forming the overlay 10, 40 upon the inner fairing substrate 12 preserves the dimensional features of the substrate 12, while ensuring complete coverage of the substrate 12. Dimensional features of the substrate 12 may include, but are not limited to: contours, size, form, and openings passing therethrough adapted to receive gauges, dials, and other desired accessories, as illustrated in FIG. 1.

In one embodiment of the invention, illustrated in FIG. 2, the overlay 10 may include a first layer 24, the first layer 24 adapted to be conformally form upon an inner fairing substrate 12 and having an inner overlay surface 26 adjacent the substrate 12, the inner overlay surface 26 adapted to be bonded to the substrate 12; and an outer overlay surface 28, the outer overlay surface 28 adapted to provide a desired appearance when the overlay 10 is formed upon the substrate 12.

In one embodiment of the invention, the outer overlay surface 28 may be adapted to include aesthetically pleasing features. Examples of aesthetically pleasing features include, but are not limited to: a texture that is simulative of materials other than that from which the overlay 10 is formed; the natural finish inherent to the material forming the overlay 28, i.e., smooth plastic; and color. Textures that the outer overlay surface 28 may simulate may include, but are not limited to: leather, metal, or wood. The outer overlay surface 28 may also include other desired textures or indicia formed thereupon.

In an embodiment of the invention, the inner overlay surface 26 and the substrate 12 may form an interface 27, as illustrated in FIG. 2. The interface 27 may operate to prevent movement of the first layer 24 with respect to the substrate 12. The interface 27 may also be formed of an adhesive 30, the adhesive 30 operating to permanently bond the inner overlay surface 26 to the outer surface 18 of the substrate 12, as illustrated in FIG. 3.

In one embodiment of the invention, the first layer 24 may be conformally formed such that the substrate 12 is conformally covered by the first layer 24, the coverage of the substrate 12 by the first layer 24 terminating at the peripheral edges 14 of the substrate 12.

Figure 4:
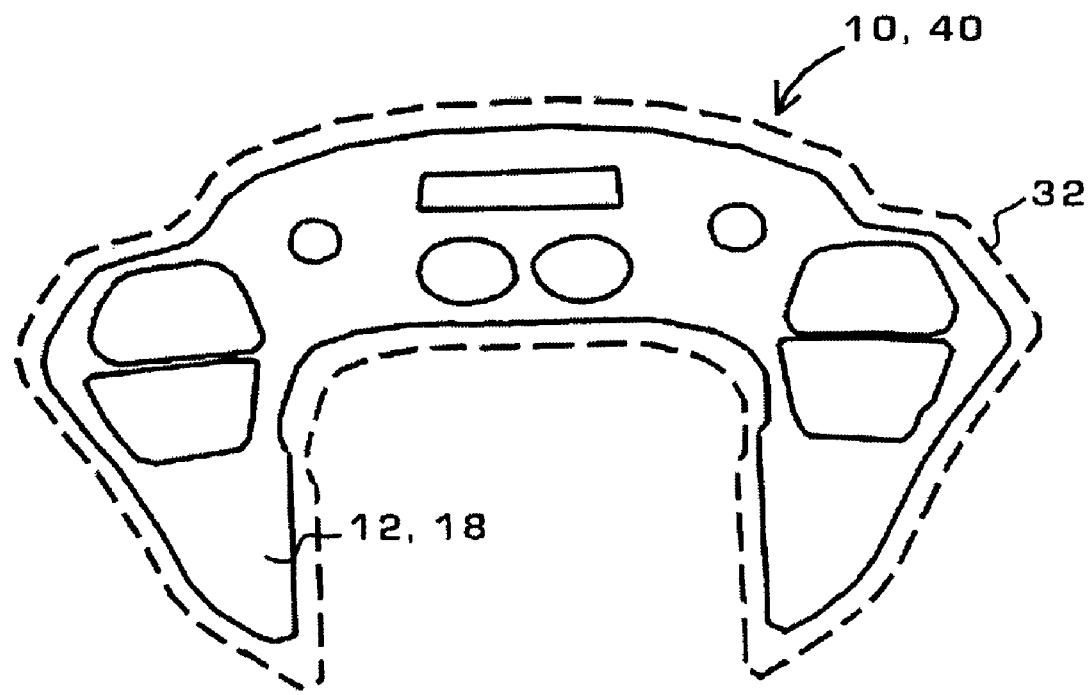
FIG. 4 illustrates a front elevation view of an overlay including excess material formed upon a motorcycle inner fairing substrate in accordance with an embodiment of the invention.
Figure 5:
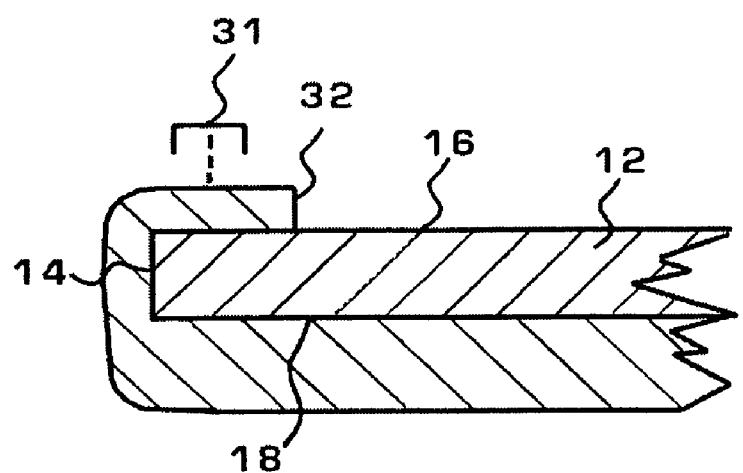
FIG. 5 illustrates a partial cross-sectional view of an overlay for the fairing shown in FIG. 1 taken along section line A-A, wherein the overlay is wrapped around the peripheral edges of the substrate in accordance with an embodiment of the invention.

In another embodiment of the invention, the first layer 24 may be conformally formed upon the outer surface 18 of the substrate 12 and include excess material 32, as illustrated in FIG. 4. The excess material 32 may be adapted to be wrapped around the peripheral edges 14 of the substrate 12 and to be folded over the inner surface 16 of the substrate 12, as illustrated in FIG. 5. The excess material 32 may be placed in mechanical engagement with the inner surface 16 of the substrate 12 by mechanical devices or chemical compounds which may include, but are not limited to: staples 31 and adhesives 30.

Figure 6:
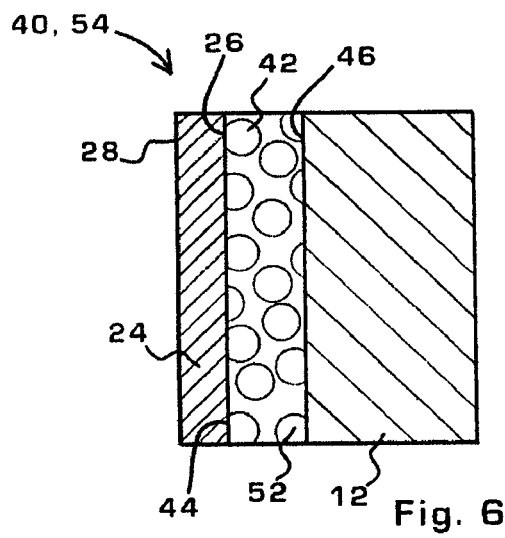
FIG. 6 illustrates a partial cross-sectional view of an overlay for the fairing shown in FIG. 1 taken along section line B-B having a first layer and a second layer formed upon a motorcycle inner fairing substrate in accordance with an embodiment of the invention.

FIG. 6 illustrates a cross-sectional view of an overlay 40 and an inner fairing substrate 12. In one embodiment of the invention, the overlay 40 may include a first layer 24 having an inner overlay surface 26 and an outer overlay surface 28; and a second layer 42 having an outer intermediary surface 44 and an inner intermediary surface 46.

In one embodiment of the invention, the second layer 42 is conformally formed upon the substrate 12, with the inner intermediary surface 46 adjacent to and bonded to the substrate 12 and the first layer 24 is conformally formed upon the second layer 42, with the inner overlay surface 26 of the first layer 24 adjacent to and bonded to the outer intermediary surface 44 of the second layer 42.

Figure 7:
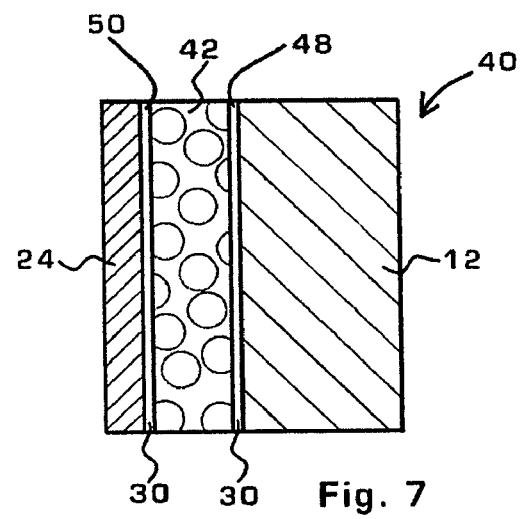
FIG. 7 illustrates a partial cross-sectional view of an overlay for the fairing shown in FIG. 1 taken along section line B-B having a first layer, a second layer, a first interface, and a second interface formed upon a motorcycle inner fairing substrate in accordance with an embodiment of the invention.

In one embodiment of the invention, illustrated in FIG. 7, the overlay 40 includes a first interface 48 formed when the inner intermediary surface 46 bonds with the outer surface 18 of the substrate 12; and a second interface 50 formed when the outer intermediary surface 44 is bonded to the inner overlay surface 26, wherein the first interface 48 and second interface 50 are formed of an adhesive 30, such that the first layer 24 and second layer 42 may not move with respect to each other or with respect to the substrate 12.

Figure 8:
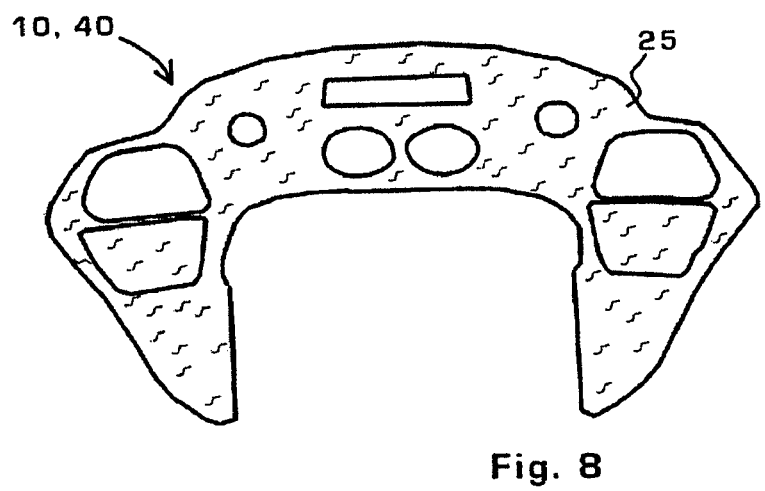
FIG. 8 illustrates a front elevation view of an overlay for a motorcycle inner fairing having a textured surface in accordance with an embodiment of the invention.

In one embodiment of the invention, illustrated in FIG. 8, the first layer 24 may be formed of a pliable material adapted to provide an aesthetically appealing appearance and further adapted to provide a surface resistant to at least one of fading, tearing, scratching, and peeling. The pliable material may be further adapted to provide a surface that scatters light incident to the first layer 24, thereby preventing incident light from being reflected upon a motorcyclist, where reflected incident light may interfere with the vision of the motorcyclist. The light incident to the first layer 24 may be scattered by a textured, a non-reflective surface 25, or a combination thereof applied thereto.

The pliable material may also be integrally formed upon a woven material, the woven material operating to provide the pliable material with additional strength and dimensional stability. Examples of a pliable material include, but are not limited to: leather, natural fibers, synthetic fibers, polyvinyl chloride, and thermoplastic olefin (TPO) plastic. A non-limiting example of a woven material is nylon.

In one embodiment of the invention, illustrated n FIGS. 6 and 7, the second layer 42 may be formed of a pliable foam 52, the pliable foam 52 operating to conform to the shape of the substrate 12 and to provide a pliable finish upon the substrate 12 when applied thereto. The pliable foam 52 operates to provide the overlay with a texture that is pliable, and therefore resistant to scratching and gouging. Examples of pliable foam 52 include, but are not limited to: closed-cell foam and open-cell foam. Additionally, the pliable foam 52 may operate to prevent the substrate 12 from shattering if the substrate 12 is exposed to excessive force, such as in an accident. The pliable foam 52 may also provide a degree of protection should a rider's head or other body part strike the overlay 40 during an accident, as the pliable foam 52 may operate to soften such an impact.

In another embodiment of the invention, the first layer 24 and second layer 42 may be conformally formed upon the outer surface 18 of the substrate 12 and include excess material 32, in the same manner as the first layer 24 illustrated in FIG. 4. The excess material 32 may be wrapped around the peripheral edges 14 of the substrate 12 and folded over the inner surface 16 of the substrate 12, in the same manner, as the first layer 24 illustrated in FIG. 5. The excess material 32 may be fastened to the inner surface 16 of the substrate 12 by mechanical devices or chemical compounds which may include, but are not limited to: staples 31 and adhesives 30.

Figure 9:
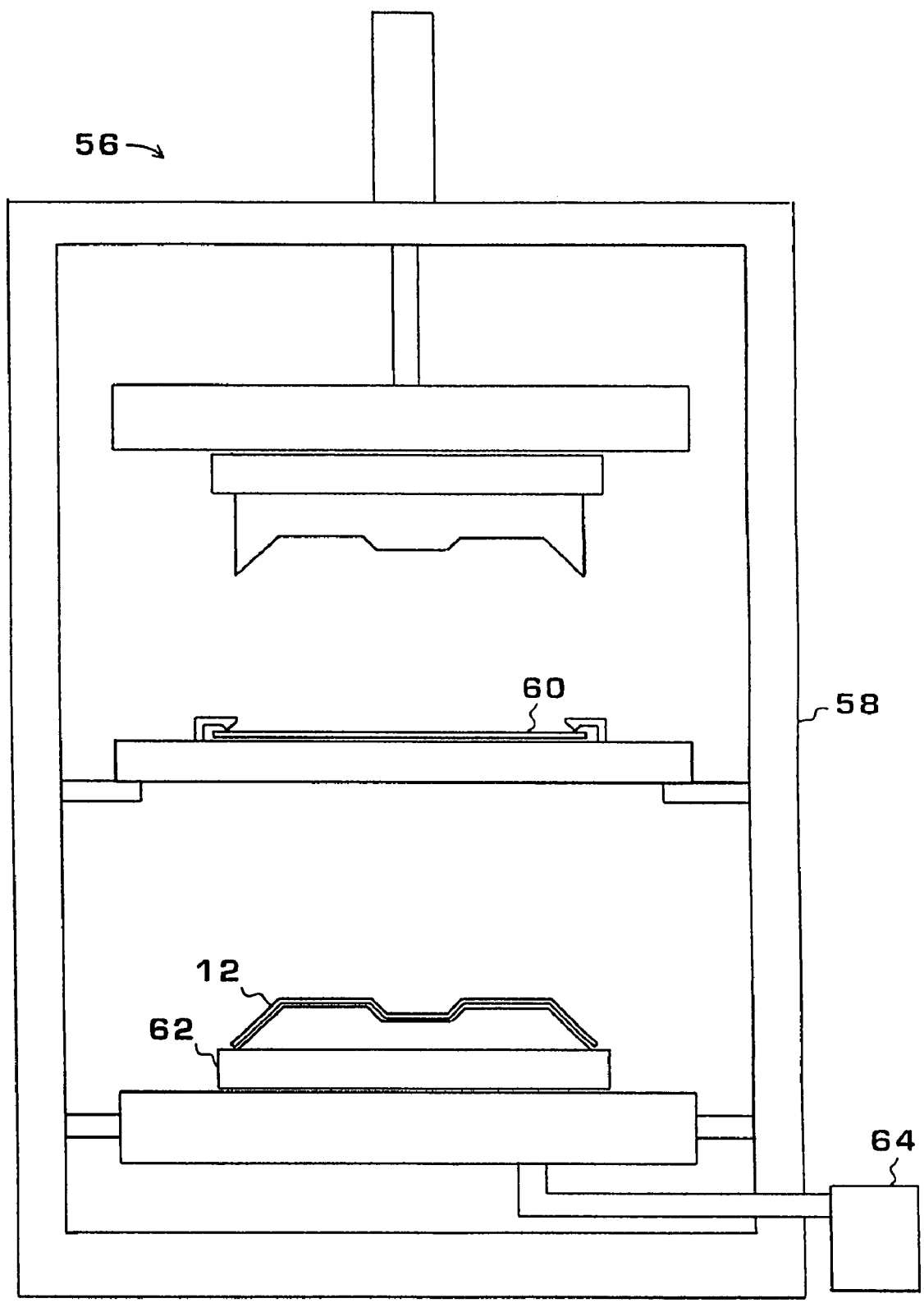
FIG. 9 illustrates an exemplary diagram of a vacuum forming machine used to form an overlay for a motorcycle inner fairing in accordance with an embodiment of the invention.
Figure 10:
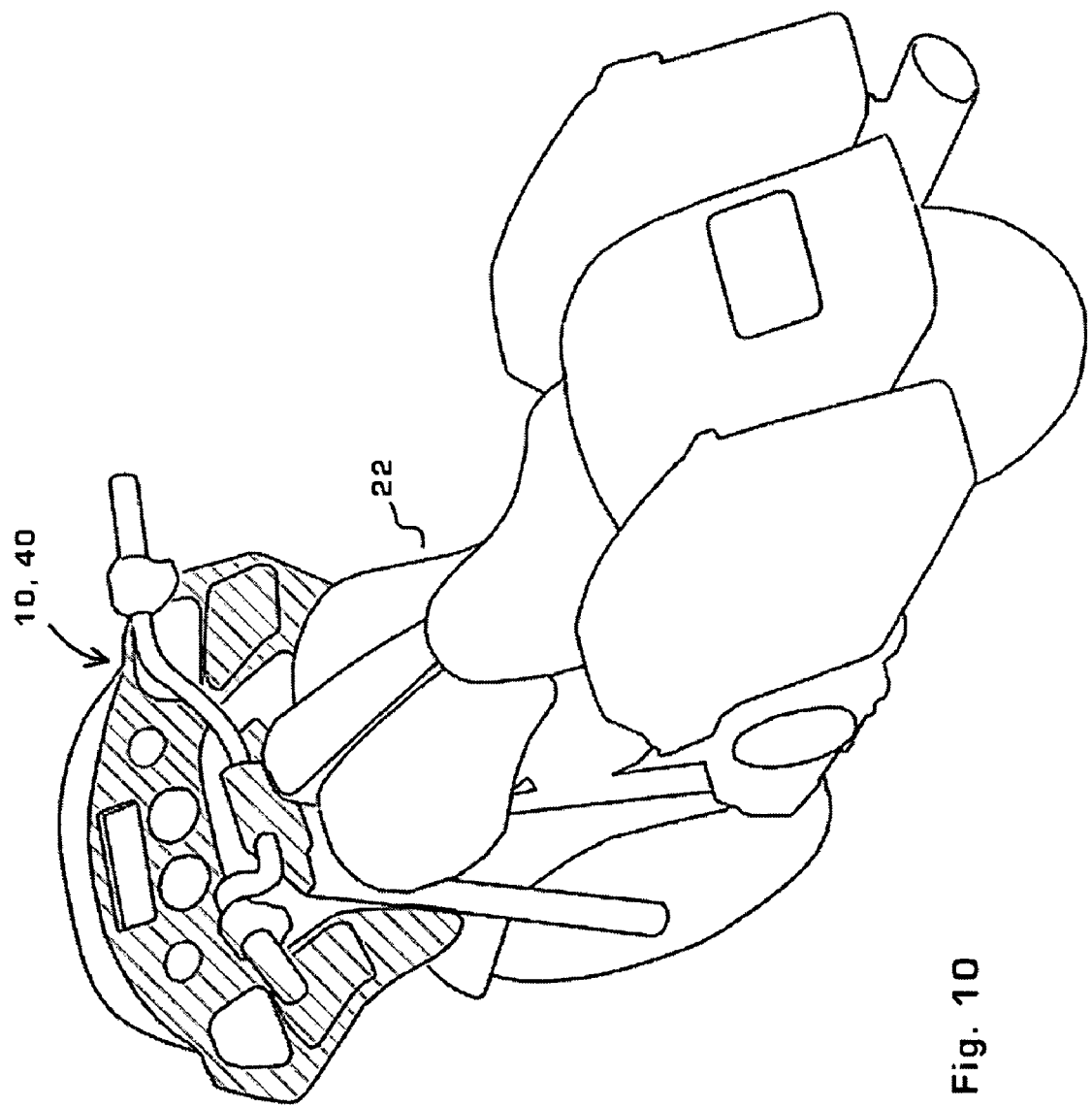
FIG. 10 illustrates an in-use view of a motorcycle having an inner fairing that includes an overlay installed thereupon in accordance with an embodiment of the invention.

In one embodiment of the invention, the overlay 10, 40 may be conformally formed upon and bonded to the substrate 12 by vacuum forming, as illustrated in FIG. 9. Vacuum forming (also known as "thermoforming") generally includes placing a substrate and the materials to be vacuum formed into a vacuum forming machine 56, the vacuum forming machine 56 including: a sealed oven 58 that operates to heat the materials to be formed 60 and the substrate 12, as well as maintaining a vacuum; a platform 62 to support tooling that supports a substrate 12; and a vacuum pump 64, the vacuum pump 64 adapted to evacuate air from the sealed oven 58 such that the materials to be formed 60 may be conformally formed upon the substrate 12. Other vacuum forming operations may include a separate oven that is not sealed, wherein the forming stage takes place in a separate forming module.

In another embodiment of the invention, illustrated in FIG. 6, the overlay 10,40 may be conformally formed upon and bonded to the substrate 12 by molding, wherein a negative mold of the substrate outer surface 18 is provided and a positive pressure applied to the overlay 10,40. The positive pressure applied to the overlay 10,40 forces the overlay 40 against the substrate 12, thereby bonding the overlay 10,40 to the substrate 12.

In another embodiment of the invention, the overlay 10,40 may be formed by injection molding, as is known in the art.

In another embodiment of the invention, the substrate 12 and overlay 10, 40 may be integrally formed as a single sheet 54. In this embodiment of the invention, the single sheet 54 may be vacuum formed or molded such that the single sheet 54 is conformably formed by vacuum forming or molding, as is disclosed herein.

While several aspects have been presented in the foregoing detailed description, it should be understood that a vast number of variations exist and these aspects are merely an example, and it is not intended to limit the scope, applicability or configuration of the invention in any way. Rather, the foregoing detailed description provides those of ordinary skill in the art with a convenient guide for implementing a desired aspect of the invention and various changes can be made in the function and arrangements of the aspects of the technology without departing from the spirit and scope of the appended claims.

What is claimed is:

1. An overlay for a motorcycle inner fairing comprising:
   a conformal overlay that conforms to dimensional features of a motorcycle inner fairing substrate, the inner fairing substrate includes a plurality of associated peripheral edges defining an inner surface, an outer surface, and an associated thickness t, the conformal overlay including
   a first layer, the first layer adapted to conformally form upon an inner fairing substrate and having an inner overlay surface adjacent the substrate, the inner overlay surface adapted to be bonded to the substrate, and
   an outer overlay surface, the outer overlay surface adapted to provide an aesthetically appealing appearance when the overlay is formed upon the substrate and further includes a surface that scatters light incident to the first layer,
   wherein the first layer is a pliable material adapted to provide an aesthetically appealing appearance including a surface resistant to at least one of fading, tearing, scratching, and peeling.

2. The overlay of claim 1, wherein the aesthetically appealing appearance comprises:
   a texture that is simulative of materials other than that from which the overlay is formed.

3. The overlay of claim 1, wherein the interface further comprises:
   an adhesive.

4. The overlay of claim 1, further comprising:
   an interface, the interface operating to prevent movement of the first layer with respect to the substrate.

5. The overlay of claim 1, wherein the overlay is conformally formed upon and bonded to the substrate by vacuum forming.

6. The overlay of claim 5, wherein the excess material mechanically engages the inner surface of the substrate by mechanical devices.

7. The overlay of claim 1, wherein the overlay is conformally formed upon and bonded to the substrate by molding, wherein a negative mold of the substrate outer surface is provided and a positive pressure applied to the overlay, whereby the positive pressure applied to the overlay forces the overlay against the substrate, thereby bonding the overlay to the substrate.

8. The overlay of claim 1, wherein the first layer is conformally formed upon the outer surface of the substrate and includes excess material, the excess material adapted to be wrapped around the peripheral edges of the substrate and folded over the inner surface of the substrate.

9. An overlay conforming to a motorcycle inner fairing comprising:
   a first layer having an inner overlay surface and an outer overlay surface, wherein the first layer is a pliable material adapted to provide an aesthetically appealing appearance including a surface resistant to fading, tearing, scratching, and peeling;
   a second layer having an outer intermediary surface and an inner intermediary surface, wherein the second layer is conformally formed upon the substrate, wherein the inner intermediary surface is adjacent to the substrate and wherein the first layer is conformally formed upon the second layer, and wherein the inner overlay surface of the first layer adjacent the outer intermediary surface of the second layer and wherein the second layer is a pliable foam, the pliable foam operating to conform to the shape of the substrate and to provide a pliable finish upon the substrate when applied thereto, wherein the pliable foam layer prevents shattering of the conformal overlay upon impact;
   a first interface formed when the inner intermediary surface bonds with the outer surface of the substrate; and
   a second interface formed when the outer intermediary surface is bonded to the inner overlay surface, wherein the first interface and second interface are formed of an adhesive, such that the first layer and second layer do not move with respect to each other or with respect to the substrate.

10. The overlay of claim 9, wherein the pliable material is further adapted to include an aesthetically appealing appearance and further comprises:
    a surface that scatters light incident to the pliable material.

11. The overlay of claim 10, wherein the outer overlay surface comprises:
    a texture that is simulative of materials other than that from which the overlay is formed.

12. The overlay of claim 9, wherein the overlay is conformally formed upon and bonded to the substrate by vacuum forming.

13. The overlay of claim 9, wherein the overlay is conformally formed upon and bonded to the substrate by molding, wherein a negative mold of the substrate outer surface is provided and a positive pressure applied to the overlay, whereby the positive pressure applied to the overlay forces the overlay against the substrate, thereby bonding the overlay to the substrate.

14. The overlay of claim 9, wherein the substrate and overlay are integrally formed as a single sheet.

* * * * *